(12) United States Patent
Masaki et al.

(10) Patent No.: US 8,075,983 B2
(45) Date of Patent: Dec. 13, 2011

(54) LAMINATED GLASS FOR VEHICLE

(75) Inventors: Yuuji Masaki, Chiyoda-ku (JP);
Kazuyuki Kurihara, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 1099 days.

(21) Appl. No.: 11/611,965

(22) Filed: Dec. 18, 2006

(65) Prior Publication Data

US 2007/0148472 A1      Jun. 28, 2007

(30) Foreign Application Priority Data

Dec. 26, 2005 (JP) .................................. 2005-372291
Jan. 25, 2006 (JP) .................................. 2006-016407
Aug. 25, 2006 (JP) .................................. 2006-229348

(51) Int. Cl.
*B32B 3/00* (2006.01)

(52) U.S. Cl. ..................... 428/195.1; 428/201; 428/210; 428/323; 428/426; 428/438

(58) Field of Classification Search ................... 428/426, 428/437, 38, 195.1, 201, 210, 214, 323
See application file for complete search history.

(56) References Cited

U.S. PATENT DOCUMENTS

| | | | |
|---|---|---|---|
| 5,013,134 A | 5/1991 | Smith | |
| 5,130,174 A * | 7/1992 | Esposito | ...................... 428/156 |
| 5,137,673 A | 8/1992 | Bourcier et al. | |
| 6,076,718 A | 6/2000 | Matsuda et al. | |
| 6,506,487 B2 | 1/2003 | Nagai | |
| 6,686,032 B1 | 2/2004 | Nagai | |
| 6,733,872 B2 | 5/2004 | Nagai | |
| 6,866,918 B2 | 3/2005 | Sauer | |
| 2002/0008926 A1 | 1/2002 | Freeman | |
| 2002/0086141 A1 | 7/2002 | Sauer | |
| 2002/0150744 A1 | 10/2002 | Nagai | |
| 2002/0172804 A1 | 11/2002 | Sauer | |
| 2004/0053006 A1 | 3/2004 | Omizu et al. | |
| 2004/0157048 A1 | 8/2004 | Nagai | |
| 2006/0008658 A1 * | 1/2006 | Fukatani et al. | .............. 428/437 |

FOREIGN PATENT DOCUMENTS

| | | |
|---|---|---|
| EP | 0 420 228 A2 | 4/1991 |
| EP | 0710545 | 5/1996 |
| EP | 1 063 205 A1 | 12/2000 |
| EP | 1 657 092 A1 | 5/2006 |

(Continued)

OTHER PUBLICATIONS

U.S. Appl. No. 12/018,497, filed Jan. 23, 2008, Masaki, et al.

(Continued)

*Primary Examiner* — Gwendolyn Blackwell
(74) *Attorney, Agent, or Firm* — Oblon, Spivak, McClelland, Maier & Neustadt, L.L.P.

(57) ABSTRACT

The present invention provides, in a HUD device employing a high-functional windshield such as a sound-insulation glass having a multi-layer interlayer, a windshield for a vehicle which does not produce double images and has excellent visibility without deteriorating functionality of the windshield. In a laminated glass having a multi-layer interlayer having a wedge-shaped thickness profile sandwiched by glass sheets, the multi-layer interlayer has layers having different hardness, the thickness of first resin layers having high hardness is at least 0.3 mm in a region within 400 nm from a lower side, which prevents the generation of optical distortion of the laminated glass and efficiently prevents double display images.

20 Claims, 8 Drawing Sheets

FOREIGN PATENT DOCUMENTS

| | | |
|---|---|---|
| JP | 03-209210 | 9/1991 |
| JP | 04-502525 | 5/1992 |
| JP | 07-172880 A | 7/1995 |
| JP | 07-237228 | 9/1995 |
| JP | 07-508690 | 9/1995 |
| JP | 08-34642 | 2/1996 |
| JP | 09-40444 | 2/1997 |
| JP | 62-20145 A | 5/1997 |
| JP | 11-43355 A | 2/1999 |
| JP | 11-130481 | 5/1999 |
| JP | 2000-44296 | 2/2000 |
| JP | 3290573 | 3/2002 |
| JP | 2002-326847 | 11/2002 |
| JP | 2004-536009 | 12/2004 |
| JP | 2005-96186 | 4/2005 |
| WO | WO 91/06031 | 5/1991 |
| WO | WO 94/00787 | 1/1994 |
| WO | WO 99/46213 | 9/1999 |
| WO | WO 02/103434 | 12/2002 |
| WO | WO 2005/018969 A1 | 3/2005 |
| WO | WO 2006/101960 | 9/2006 |
| WO | WO 2006/101960 A1 | 9/2006 |
| WO | WO 2006/122305 A2 | 11/2006 |

OTHER PUBLICATIONS

JP Office Action mailed Dec. 22, 2009 in corresponding JP Application No. 2006-229348 (with English translation).

Third Party Observations submitted to EPO, dated Aug. 9, 2008.

\* cited by examiner

— PRIOR ART —

LAMINATED GLASS FOR VEHICLE

FIELD OF THE INVENTION

The present invention relates to a laminated glass for a vehicle which can be suitably used for a display device such as a head-up display, and to a head-up display using such a laminated glass.

DISCUSSION OF THE BACKGROUND

For a window glass provided in front of a driver of a vehicle such as an windshield for an automobile, a laminated glass is usually employed, which is constituted by two glass sheets opposed to each other and an interlayer made of a resin sandwiched between them. Further, a technique of display device for a vehicle is known, which is a head-up display (hereinafter referred also to as HUD) displaying a display information in the front view field of a driver, such as an windshield.

As a conventional HUD device, there is one as shown in FIG. 16, in which a light beam 52 of display information projected from a projector 51 of a HUD device 50, is reflected by a point A on a surface in a car-interior side of an windshield and forms a display image (virtual image) 54 at a forward position outside the car, and another light beam 53 of display information is incident at a point B on the 1st face in a car-interior side of the windshield, refracted and reaches to a point C on 1st face of the windshield. The light beam of display information is partially reflected by the point C, incident at the point A of the $1^{th}$ face, refracted and forms a display image (virtual image) 55, that is visible to a driver 26. However, in the HUD device 50, there is a demerit that the display image 54 formed by the reflection at a surface in the car-interior side of the windshield and a display image 55 formed by reflection at a surface in the car-exterior side of the windshield, are shift from each other to be visible as double images (so called ghost).

As means for preventing such double images, a method of making the position of display image in a distance to make the shift of the double images smaller than the resolution of eyes, a method of providing an optical rotator between a car-exterior side glass sheet and a car-interior side glass sheet of the laminated glass to make display light incident into the car-exterior side glass sheet at a Brewster Angle of P-polarization to prevent reflection, a method of making the angles of a car-interior side surface and a car-exterior side surface of the windshield different so that the windshield has a wedge-shaped thickness profile to make light paths of display images from the respective surfaces the same, etc., are proposed (for example, Patent Document 1).

On the other hand, in recent years, according to increase of demand for high-functional windshields for improving light-weight or amenity of e.g. automobiles, windshields having various functions have been devised. For an interlayer in a laminated glass for such a high-functional windshield such as a laminated glass having an increased ability to insulate sounds (hereinafter also referred to as laminated insulated glass), often a multi-layer interlayer formed by laminating resin layers having various functions is employed. Further, on a surface of an interlayer of a laminated glass, an emboss is usually provided for prevention of blocking phenomena, and for improvement of workability or improvement of deaeration property at a time of preliminary press-bonding.

In such a laminated glass employing a multi-layer interlayer, often optical distortion occurs, which causes a problem of distorting through-the-glass image. To cope with this problem, a method has been proposed, in which the shape of emboss on a surface of the interlayer is changed, and an emboss shape not generating optical distortion is formed on interfaces between the resin layers in the interlayer (for example, Patent Document 2).

Patent Document 1: JP-A-2-279437
Patent Document 2: JP-A-11-35348

The method of forming the windshield to have a wedge-shaped thickness profile as means for preventing double images of a HUD device, has such merits that light utilization efficiency is high as compared with other means for preventing double images, that the construction of the device is simple, or that visibility of a driver is not deteriorated since there forms no border line in the windshield.

However, when such a multi-layer interlayer is used for a windshield having a wedge-shaped thickness profile to constitute a HUD device, there has been a problem that due to optical distortion caused by the multi-layer interlayer in the display area, the display quality is deteriorated.

Particularly, in a case of employing the multi-layer interlayer as it is expanded in a substantially trapezoidal shape being the plane shape of the laminated glass, it is necessary to control the thickness of the multi-layer interlayer so as to have a wedge-shape at the same time of the expansion. At this time, there has been a problem that an optical distortion shows up in a portion where the interlayer is thin, which is caused by the interlayer. This problem is significant in a high-functional windshield typified by a laminated insulated glass, employing a multi-layer interlayer having a layer softer than commonly used polyvinyl butyral (hereinafter also referred to as PVB) being the material of the most commonly-used interlayer.

Further, in order to satisfy the demand for light-weight of vehicles, laminated glasses for vehicles tend to be thinner year after year. Accordingly, when the above-mentioned multi-layer interlayer is employed, restriction of the thickness of each layer constituting the interlayer becomes more strict. As a result, it has become extremely difficult to solve both of two problems at the same time, that are to employ a high-functional windshield and to prevent double images in a case of HUD device employing an windshield having a wedge-shaped thickness profile.

To cope with this problem, it is an object of the present invention to provide, in a HUD device employing a high-functional windshield having a multi-layer interlayer, an windshield for a vehicle which does not generate double images of display and is excellent in visibility, and a head-up display device employing such an windshield.

SUMMARY OF THE INVENTION

The present invention provides a laminated glass for a vehicle, comprising two curved glass sheets and an interlayer made of a multi-layer resin and provided between the glass sheets, the glass sheets and the interlayer being laminated together, wherein the interlayer is a multilayer film comprising at least one first resin layer and at least one second resin layer having lower hardness than that of the first resin layer, wherein the interlayer has a wedge-shaped thickness profile in which the upper side of the interlayer, when the laminated glass is in a position attached to a vehicle, is thicker than the lower side of the interlayer, and wherein the thickness of the first resin layer is at least 0.3 mm in an area within 400 mm from the edge of the lower side.

A second embodiment of the present invention provides the laminated glass for a vehicle according to the first embodiment, wherein the interlayer comprises three layers which are the second resin layer and the first resin layers sandwiching the second resin layer.

A third embodiment of the present invention provides is the laminated glass for a vehicle according to the first or the second embodiment, wherein at least one layer of the first resin layers has a wedge-shaped thickness profile in which the upper side of the layer is thicker than the lower side of the layer.

A fourth embodiment of the present invention provides the laminated glass for a vehicle according to the first or the second embodiment, wherein at least one layer of the second resin layers has a wedge-shaped thickness profile in which the upper side of the layer is thicker than the lower side of the layer.

A fifth embodiment of the present invention provides the laminated glass for a vehicle according to any one of the first to the fourth embodiments, wherein IR cutoff fine particles are dispersed in the first and/or the second resin layer having the wedge-shaped thickness profile.

A sixth embodiment of the present invention provides the laminated glass for a vehicle according to any one of the first to the fifth embodiments, wherein the thickness of the first resin layer in the upper side is at least 0.5 mm.

A seventh embodiment of the present invention provides the laminated glass for a vehicle according to any one of the first to the sixth embodiments, which further comprises a shade functional area having a strip shape along the upper side.

An eighth embodiment of the present invention provides the laminated glass for a vehicle according to the seventh embodiment, wherein the shade functional area is formed in the layer having the wedge-shaped thickness profile.

A ninth embodiment of the present invention provides the laminated glass for a vehicle according to the seventh embodiment, wherein the IR cutoff fine particles are dispersed in the layer having the shade functional area.

A tenth embodiment of the present invention provides a head-up display device comprising a light source for emitting light beam of display information, a glass sheet disposed so as to be opposed to the light source and a display area formed on the glass sheet and for displaying the display information emitted from the light source, wherein the glass sheet is a laminated glass sheet in which two curved glass sheets and an interlayer made of a multilayer resin provided between the glass sheets, are laminated together, the laminated glass has a wedge-shaped thickness profile in which the upper side of the laminated glass, when the laminated glass is attached to a vehicle, is thicker than the lower side of the laminated glass, the interlayer comprises at least a first resin layer and a second resin layer having a hardness lower than that of the first resin layer, and the thickness of the first resin layer in the display area is at least 0.3 mm.

Here, the hardness of the resin layers of the present invention can be defined by the Rockwell hardness, elasticity modules and/or the elongation percentage. The second resin layer is designated as a layer having a smaller Rockwell hardness and larger elasticity modulus and/or elongation percentage as compared with the first resin layer.

The present invention enables to solve double images of display produced by a HUD device employing a high-functional windshield having a multi-layer interlayer, and to provide an windshield for a vehicle having high visibility and a HUD device employing such an windshield.

Accordingly, it becomes possible to achieve the following two objects that have been heretofore difficult to achieve at the same time. The objects to achieve at the same time, are to employ a high-functional windshield such as a laminated insulated glass having a low hardness layer as an interlayer, and to prevent double images of a HUD device employing an windshield having a wedge-shaped thickness profile.

In more detail, in a multi-layer interlayer having a wedge-shaped thickness profile, the thickness of the first resin layer having relatively higher hardness is at least 0.3 mm in a region within 400 mm from the lower side edge. Accordingly, it is possible to prevent optical distortion caused by the interlayer in a display region of a HUD device.

This is because influence of concave-convex profile of a surface of interlayer formed by emboss process, that is the main cause of optical distortion, does not remain when the laminated glass is formed by press-bonding. By making the thickness of the first resin layer at least 0.3 mm, it becomes possible to improve shape-keeping property of the interlayer, and to prevent generation of optical distortion without deteriorating anti-blocking property of the interlayer when a laminated glass is formed.

Further, since the interlayer has layers having different hardness and layer(s) having higher hardness supports layer(s) having lower hardness, it becomes possible to expand the interlayer to have a wedge-shape. Accordingly, it becomes possible to use an interlayer having low hardness for a laminated glass, that has been heretofore difficult.

Further, in a construction that at least one layer of the first resin layers has a wedge-shaped thickness profile in which the upper side of the layer is thicker than the lower side of the layer, expansion work of the interlayer becomes easy. This is because the first resin layer having high hardness and excellent in shape-keeping property has a wedge-shaped thickness profile, and thus, control of layer thickness becomes easy.

Further, by quantifying the minimum thickness of the first resin layer, efficient construction of the interlayer and efficient design of a laminated glass become possible. Accordingly, it becomes possible to reduce the weight of the laminated glass, to contribute to light weight of a vehicle or to cut down its cost. Further, by limiting the region of the first resin layer in which the minimum layer thicknesses is specified, workload for thickness control of the interlayer or for the film-expansion step is reduced.

In a case where the interlayer has a three layer structure in which a second resin layer having a lower hardness is sandwiched by first resin layers having higher hardness, concave-convex profile on a surface of the interlayer is formed by forming such a profile on a layer having higher hardness, and the layer having higher hardness has the minimum layer thickness required for preventing distortion due to the influence of the concave-convex profile. Accordingly, it is possible to efficiently prevent optical distortion of a laminated glass. Further, since a layer having high shape-keeping property forms a surface of the interlayer, expansion of the interlayer becomes easy.

Further, the construction that also the first resin layers for sandwiching the second resin layer and having higher hardness have wedge-shaped thickness profiles, is suitable in a case where the first resin layer is made of a commonly used material and the second resin layer is a layer provided with a specific function. Since it is possible to achieve the difference of the layer thicknesses to form the wedge-shape by the first resin layer, it becomes possible to minimize the thickness of the second resin layer. By this construction, it is possible to reduce the influence of the difference of the refractive indexes between layers in the interlayer. Further, it becomes possible to minimize the thickness of the layer provided with a function. These features contribute to reduce cost.

Further, by expanding an interlayer having substantially rectangular shape and an uniform layer thickness, to substantially trapezoidal shape, it is possible to form a desired plane shape and a wedge-shaped thickness profile at the same time. As a result, it is possible to achieve efficient production step. Further, it becomes possible to change the timing or the order of the expansion step, whereby it becomes possible to appropriately select the thickness or the plane shape of the interlayer. Accordingly, it becomes possible to select the method of transportation or the method of production that are suitable for the form of the production. Namely, the present invention increases the flexibility of business and enables efficient production.

In a construction that the second resin layer having lower hardness has a wedge-shaped thickness profile, since the thickness of the layer having lower hardness can have a sufficient thickness, it is easy to add a function of e.g. sound insulation. Further, in this construction, the first resin layer for sandwiching the second resin layer having lower hardness, does not necessarily have a wedge-shape. Accordingly, the construction is suitable in a case where the three layers are formed to have respective desired shapes and thicknesses and they are laminated together to form an interlayer.

In a construction that the thickness of the upper side of the first resin layer is at least 0.5 mm, the first resin layer having higher hardness has a constant thickness over the entire surface of the interlayer. This construction improves shape-keeping property of the entire interlayer and to more accurately eliminate influence of concave-convex profile formed by an emboss process of the surface of the interlayer. As a result, it is possible to prevent optical distortion of a laminated glass. Further, it becomes easy to form a wedge-shaped thickness profile of the interlayer and to maintain the shape, and accordingly, it is possible to more easily and securely obtain the effect of preventing double images of HUD.

Further, by providing a shade functional area, it is possible to reduce dazzle for a driver due to light. Further, since it is possible to design the color or the shape of the shade functional area variously, completeness of design of external appearance improves.

Further, in the construction that the shade functional area is formed on a layer having a wedge-shaped thickness profile, according to the change of the thickness of the wedge-shaped thickness profile, the thickness of the colored layer changes stepwise. By this construction, it becomes easier to form a gradation in the shade functional area. Further, since it is possible to form a desired plane shape of the interlayer, a wedge-shaped thickness profile, and a shade functional area at the same time, it is possible to simplify the production process.

Further, in the HUD device employing the above-mentioned laminated glass, the thickness of the first resin layer in the display region is at least 0.3 mm. This construction suppresses generation of double images of display image and generation of optical distortion of the laminated glass, and realizes a HUD device employing a high-function windshield. Further, by employing a laminated glass providing the above-mentioned effect, it becomes possible to provide a HUD device having high performance and high flexibility of design at low cost.

BRIEF DESCRIPTION OF THE DRAWING

Now, the present invention will be described in detail with reference to the preferred embodiments.

In the accompanying drawings.

DESCRIPTION OF THE PREFERRED EMBODIMENTS

The present invention is described with reference to the drawings, using an windshield being a laminated shielded glass and a HUD device employing such an windshield as examples.

Here, in the present invention, an upper side and a lower side indicate sides on the upper side and the lower side respectively of a laminated glass or an interlayer of a laminated glass in a state that it is attached to a vehicle, and left/right sides indicate other two sides. Further, a surface in a convex side of a glass sheet disposing in a convex side among two curved glass sheets, is designated as a 1st face, a concave side surface of the glass sheet is designated as a 2nd face, a convex side surface of a glass sheet disposed in a concave side is designated as a 3rd face, and a concave side surface of the glass sheet is designated as a 4th face. Namely, in a state that a laminated glass is attached to a vehicle such as an automobile, front and rear surfaces of glass sheets of the laminated glass are designated as 1st to a 4th faces from the car-exterior side towards the car-interior side.

Further, a laminated insulated glass means a laminated glass which can reduce resonation of vibration of the laminated glass with sound waves of various sounds such as a sound generated at a time of running an automobile and entering from the car-exterior side to the laminated glass or a sound of engine, to shield propagation of sound. Particularly, such a laminated shielded glass means a laminated glass which has a performance of efficiently shielding a sound in the vicinity of a frequency of 5,000 Hz being an extremely uncomfortable sound for passengers of a vehicle, that is contained in e.g. a whistling sound when an automobile is running, a vibration sound of e.g. a wiper and a squeaking sound of an automobile body, and to improve sound amenity in a cabin.

First Embodiment

Figure 1:
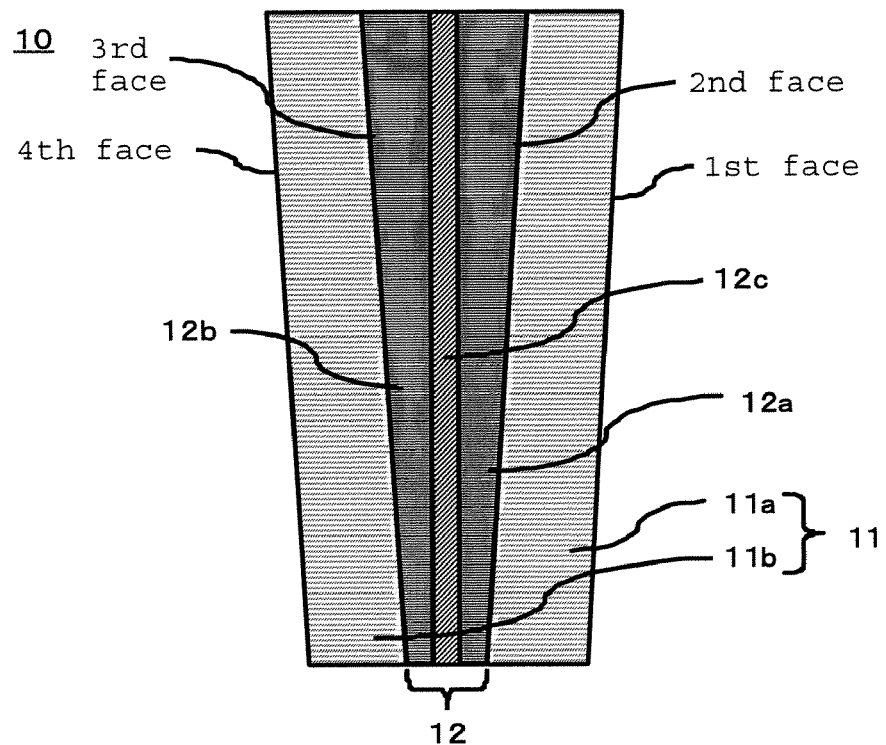
FIG. 1 is a cross sectional view showing an example of the construction of a laminated glass according to the present invention.
Figure 2:
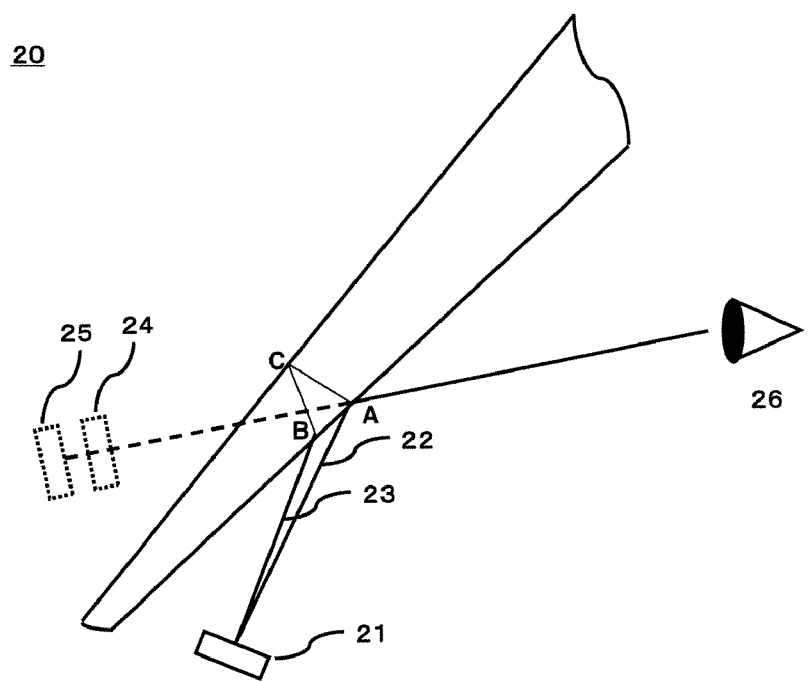
FIG. 2 is a schematic view showing an example of the construction of a head-up display device according to the present invention.

FIGS. 1 and 2 are cross sectional views showing an example of the construction of a laminated glass according to the present invention, and a head-up display device employing the laminated glass according to the present invention respectively.

As shown in FIG. 1, in a laminated glass 10, a multi-layer interlayer 12 made of a resin is sandwiched between two curved laminated glass sheets 11a and 11b. The thickness of each of the glass sheets 11 is uniform, and the interlayer 12 has a wedge-shaped thickness profile in which the upper side is thick and the lower side is thin. Since the glass sheet 11 are bonded so as to sandwich the wedge-shaped interlayer 12, the 1st face and the 2nd face as surfaces of the glass sheet 11a are disposed in non-parallel with the 3rd face and the 4th face as surfaces of the glass sheet 11b. As a result, the laminated glass 10 has a wedge-shaped thickness profile.

The interlayer 12 is a multi-layer film comprising surface layers 12a and 12b (first resin layers) bonded to the 2nd face of the glass sheet 11a and the 3rd face of the glass sheet 11b respectively, and a sound insulation layer 12c (second resin layer) sandwiched by the surface layers. The surface layers 12a and 12b each has a wedge shape in which the upper side is thicker and the lower side is thinner, and the sound insulation layer 12c is made of a resin having a hardness lower than that of the surface layers. Further, the surface layers 12a and 12b each has a thickness of at least 0.3 mm in a region within 400 mm from the lower side edge or within a display region.

In the construction of the interlayer 12, by making the thickness of each of the surface layers 12a and 12b at least 0.3 mm in a region within 400 mm from the lower side edge, it is possible to prevent generation of optical distortion due to an emboss process of a surface of the interlayer. Usually, a concave-convex profile is formed on a surface of an interlayer of a laminated glass to prevent blocking and to improve deaeration property. In the present invention, since the influence of the concave-convex profile does not remain when a laminated glass is formed by press-bonding, and thus, generation of optical distortion can be prevented. Further, by making the thickness of the surface layers at least 0.3 mm, it is possible to improve shape-keeping property of the interlayer 12, and to prevent optical distortion of a laminated glass without deteriorating anti-blocking property of the interlayer 12.

Further, the interlayer has layers having different hardness, and layer(s) having higher hardness supports layer(s) having lower hardness. Accordingly, it becomes easy to expand the interlayer to have a wedge shape. Accordingly, it becomes possible to use an interlayer 12 having a layer of hardness for a laminated glass, that has been heretofore difficult.

Further, the interlayer has at least one surface layer having high hardness, and the interlayer has a wedge-shaped thickness profile in which the upper side is thicker than the lower side, which increases shape-keeping property of the interlayer 12. As a result, it becomes possible to control the thickness of the interlayer and to simplify expansion step.

Further, in the construction, the interlayer 12 has a three layer structure in which a sound insulation layer 12c having low hardness is sandwiched by surface layers 12a and 12b having high hardness. By this construction, surface concave-convex profile is formed on a layer having high hardness in the entire region of the interlayer, and the layer having high hardness has a minimum thickness capable of preventing distortion due to the concave-convex profile. Accordingly, it is possible to efficiently prevent optical distortion of the laminated glass. Further, since a layer having high shape-keeping property forms a surface of the interlayer, the expansion of the interlayer 12 becomes still more easy.

Further, this construction is suitable in a case where the first resin layers 12a and 12b are made of a widely used material and the second resin layer has a specific function such as sound insulation. At the same time, in this construction, since it is possible to obtain the difference of the film thickness required to form a wedge-shaped thickness profile in each of the surface layers 12a and 12b, it becomes possible to minimize the thickness of the sound insulation layer 12c. Accordingly, it is possible to reduce the influence of the difference of the refractive indexes between the layers in the interlayer 12. Further, it becomes possible to minimize the thickness of a resin layer having a function of interlayer, which contributes to realize a low-cost design.

Further, by quantifying the minimum thickness of the surface layers 12a and 12b, it becomes possible to efficiently design the constructions of the interlayer and the laminated glass, which can contribute to reduce the weight of a vehicle or reduction of cost. Further, by limiting the region in which the minimum thickness of the surface layer is specified, it is possible to reduce workload for controlling the thickness of the interlayer 12 or for a step of expanding the film.

The minimum angle of the wedge-shaped thickness profile of the interlayer is at least 0.25 mrad to obtain an effect of preventing double images, preferably at least 0.3 mrad considering variation of the thickness at a time of expanding a rectangular-shaped interlayer to have a substantially trapezoidal shape. If it is possible to ensure the thickness accuracy of the interlayer, the angle is more preferably at least 0.4 mrad, with which further preferable effect of preventing double images is obtainable.

The maximum angle of the wedge-shaped thickness profile of the interlayer is at most 1.8 mrad to prevent double images, preferably at most 0.9 mrad. By the construction, display quality such as prevention of a distortion, especially double images, is improved. Further, dependence of display quality on the construction of a HUD device such as the curvature of the curved glass sheets or the display distance, is reduced, whereby a laminated glass having such a construction can be applied to display devices having various constructions. Considering the variation of the thickness of the interlayer at a time of expanding the rectangular-shaped interlayer into a substantially trapezoidal shape, the maximum angle is more preferably at most 0.7 mrad, still more preferably at most 0.6 mrad if it is possible to ensure the film thickness accuracy. In such a construction, it becomes possible to make the thickness of the interlayer the minimum thickness for exhibiting the function of the interlayer, and to provide a laminated glass of light-weight, low cost and suitable for the HUD device 20, and to provide a HUD device employing such a laminated glass.

The thickness of a laminated glass changes according to change of the angle of the wedge-shaped thickness profile at a time of forming an windshield. 1 mrad of the change of the angle corresponds to about 1 mm of thickness change per 1 m of cross section. The thickness at the lower side of an interlayer of the present invention is at least bout about 0.7 mm. Accordingly, in a normal windshield for automobiles, the thickness of the upper side of the interlayer can be from 0.85 to 2.5 mm, preferably from 0.9 to 1.8 mm, more preferably from about 1.1 to 1.3 mm. For glass sheets sandwiching the interlayer, known glass sheets can be employed, and the thickness of the laminated glass 10 depends on the thickness of the glass sheets. The thickness of the glass sheets employed at this time is preferably from 1 to 3 mm.

The thicknesses of the upper side of the surface layers 12a and 12b are preferably at least 0.5 mm, more preferably at least 0.6 mm. Further, the surface layers 12a and 12b each has at least a predetermined thickness in the entire region of the interlayer. Accordingly, shape-keeping property of entire interlayer improves, and influence of concave-convex profile formed by an emboss process of a surface of the interlayer can be more securely eliminated. Further, optical distortion of a laminated glass can be prevented. Further, it becomes possible to form and maintain the wedge-shaped thickness profile of the interlayer, and to more efficiently and securely obtain an effect of preventing double images.

Then, a head-up display device employing the laminated glass of the present invention is described with reference to FIG. 2. As shown in the figure, a light beam of display information 22 output from a projector 21 of a HUD device 20 is reflected at a point A of the 4th face being a car-interior side surface of an windshield, and forms a display image (virtual image) 24. Further, another light beam of display information 23 is incident at a point B on the 4th face of the windshield, reflected, and reaches to a point C of the 1st face of the windshield. The light beam of display information 23 is partially reflected at the point C, reaches a point A of the 4th face, and refracted to form a display image 25. As a result, light paths of the light beams of display information 22 and 23 reflected at the point A on the 4th face and the point C on the 1st face respectively, and reach a driver 26, overlap with each other. Accordingly, the display image 24 and the display image (virtual image) 25 are observed as they are overlapped with each other from the driver 26, and thus, double images are not formed.

At this time, surface layers 12a and 12b and the glass sheets 11a and 11b have substantially the same refractive index. Accordingly, optical distortion is not generated. Further, by making the thickness of the sound insulation layer 12c at most 0.5 mm, it is possible to suppress double images to a degree not affecting actual display quality. Further, the thickness of the sound insulation layer 12c is more preferably at least 0.1 mm to substantially prevent generation of visible optical distortion. According to these limitations, in the construction of the present invention, it is possible to realize both a laminated insulated glass being a typical high-functional laminated glass and a HUD device not producing double images.

In the above-mentioned construction, surface layers 12a and 12b of an interlayer each has a wedge-shaped thickness profile. However, the construction may be such that one of the surface layers has a wedge-shaped thickness profile and the other has a uniform thickness so long as the surface layers 12a and 12b of the interlayer has a thickness of at least 0.3 mm in a region within a 400 mm from a lower side edge of an windshield or in a display region. Further, the angle of the wedge-shaped thickness profile outside the display region is not necessarily the above-mentioned angle, and the laminated glass may have a non-wedge-shaped thickness profile (for example, an uniform thickness profile) out of the display region. According to this construction, it becomes possible to form segment interlayers and bond them together to form an interlayer, and thus, the production process becomes more flexible.

Figure 3:
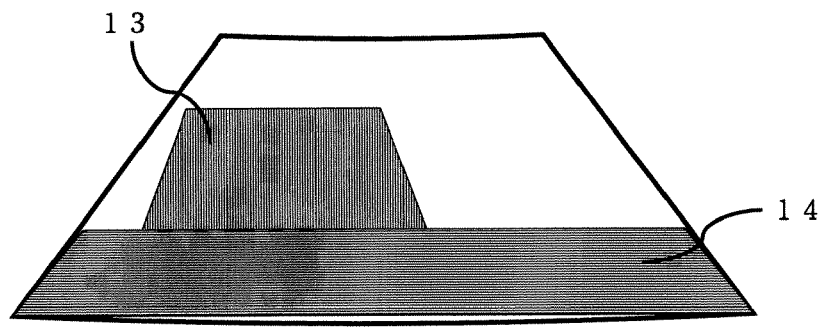
FIG. 3 is a plane view showing an example of a display area of a laminated glass according to the present invention.

FIG. 3 is a plane view showing an example of a display region of a laminated glass according to the present invention. The display region 14 in the present invention designates a region of an windshield which reflects display data emitted from a projector of a HUD device. Further, the display region has an upper side defined by an expanded line of a lower side of a test region A (13 in the figure), and the display region indicates a region encompassed by a lower side and left and right sides of a laminated glass and the above- mentioned upper side. Here, the test region A is a test region for a safety glass according to JIS R3212 to be used for safety glazing materials for road vehicles. Further, the lower side of the test region A is defined by a cross line where a plane passing through a point $V_2$ and in parallel with the Y axis and 1° inclined in a Z direction from the X axis, crosses an outer surface of an windshield glass. Here, the point $V_2$ corresponding to a viewpoint of a driver is defined by XYZ values in a three-dimensional orthogonal coordinates with reference to an origin R in a rear seat.

Further, an interlayer to be laminated may be configured to have a wedge-shaped thickness profile only within a part of the plane of a laminated glass within a range that the refractive index of the interlayer, reflectivity at the interface or absorptivity does not produce optical distortion. In this construction, it becomes possible to appropriately change the thickness of the interlayer within a region in the plane of a laminated glass, which increases flexibility of design. Further, it becomes possible to also form the interlayer having minimum thickness, which enables low cost design and production.

For the surface layers 12a and 12b of the interlayer, a known transparent resin is applicable but polyvinyl butyral or polyethylene terephthalate is preferably employed. Further, the sound insulation layer 12c is preferably made of a material which can maintain its film-shape by itself from a view point of easiness of producing the interlayer 12. For example, a PVB modified material, an ethylene-vinyl acetate copolymer (EVA) material, an urethane resin material, a vinyl chloride resin material, a silicone resin material or the like is preferably employed.

Further, the sound insulation layer 12c is a layer having low hardness, and it is effective to make the rigidity as low as possible. For this purpose, the sound insulation layer 12c preferably has the minimum rigidity to maintain the state of a film (a state of e.g. cooled and consolidated gel or a gelatin). Specifically, a film having a Rockwell hardness smaller, and having an elastic modulus and/or elongation percentage larger than those of polyvinyl butyral (PVB) to be employed for an interlayer of a common laminated glass for automobile windows, is preferably employed as the sound insulation layer 12c.

Further, the difference of thickness between the surface layer 12a or 12b and the sound insulation layer 12c of an interlayer, can be expressed in a relative value. Further, the hardness can be changed by changing the composition of a layer. For example, in a case of PVB film, content of plasticizer preferably differs at least 10 wt %. Further, the content of the plasticizer is preferably about 30 wt % in the surface layer and about 40% in the sound-insulation layer.

Further, the interlayer 12 may have a shade functional area. The shade functional area is an area of so-called shade band in which visible light transmittance is reduced. The shade functional area can be formed by mixing a colorant in the interlayer, or by printing or painting a colorant on a surface of the interlayer.

The shade functional area is usually formed into a strip shape along an upper end of an windshield. At this time, the shade functional area may be formed uniformly on the surface or it may be formed in a dot pattern, or it may have a gradation. The visible light transmittance is preferably adjusted so that it gradually increases from an upper side of the interlayer towards a lower side since such a construction provides anti-dazzle property without deteriorating visibility for a driver. Further, a boarder between the shade functional region and a non-shade functional region having high transmittance of visible light, may be blurred so as to be unclear.

Figure 9:
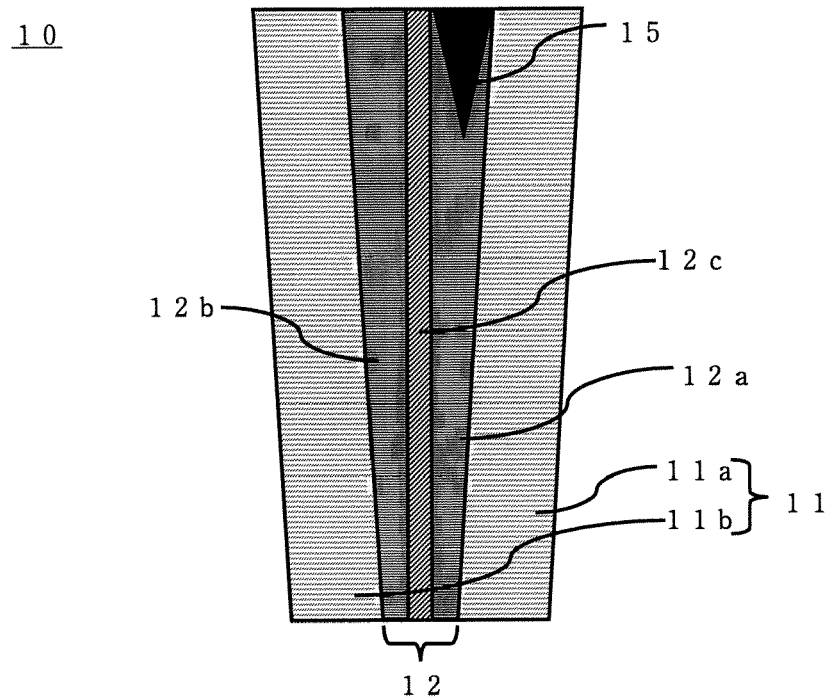
FIG. 9 is a cross sectional view showing an example of the construction of a laminated glass according to the present invention.

FIG. 9 is a cross sectional view showing an example of the construction of a laminated glass having a shade band in a surface layer 12a of an interlayer. As shown in FIG. 9, in a case of employing an interlayer having colored surface layers 12a or 12b, a shade band 15 being a shade functional area can be formed by laminating glass sheets 11 and an interlayer 12, whereby production process can be simplified. Further, as compared with a case of coloring a soft layer in the interlayer 12c, migration of the colorant to other layers is reduced, and it becomes possible to suppress generation of e.g. color blurring at an interface of the shade band.

Further, by coloring both of the surface layers 12a and 12b, colors of the laminated glass observed from the car-interior side and the car-exterior side become the same, which reduces the difference in design. Further, the interlayer 12 becomes reversible at a time of rolling the film of the interlayer or at a time of laminating the interlayer in the laminated glass, which provides an effect that control becomes easy.

Figure 10:
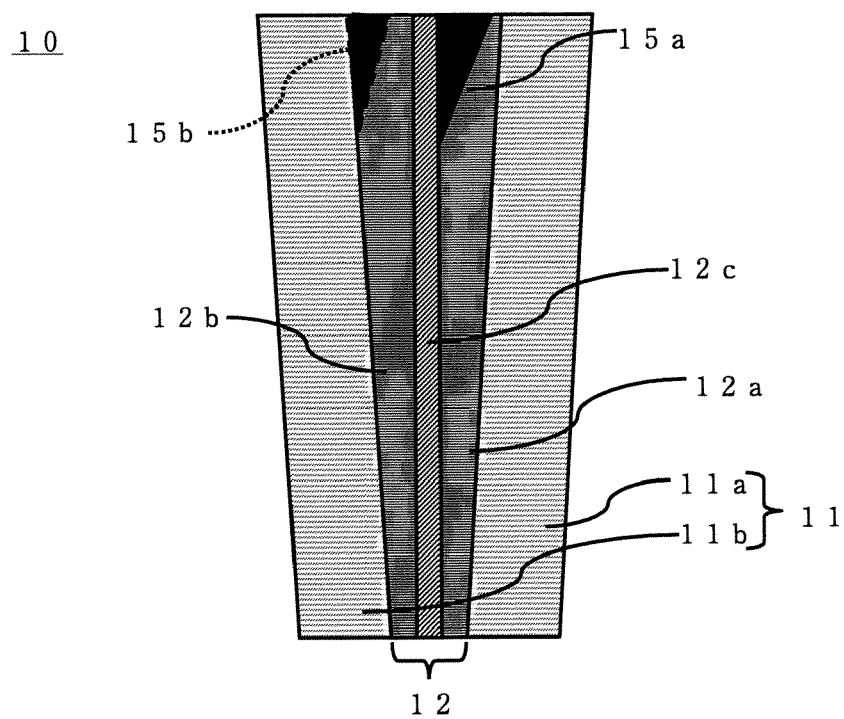
FIG. 10 is a cross sectional view showing an example of the construction of a laminated glass according to the present invention.

The shade band 15 can be formed by forming a notch at a center portion of the surface layer 12a and/or 12b and co-extruding the film together with a pigment or a dye etc. Forming such a notch portion in advance provides an effect that not only the co-extrusion becomes easy but also discoloring or migration of the colorant to other layers such as the sound-insulation layer 12c or the glass sheet 11 is further reduced since the colored layer does not appear on a surface of the surface layer 12a. Further, the shade band 15 is not necessarily formed in the central portion of the surface layer 12a or 12b but may be formed in a sound insulation layer 12c side like a shade band 15a shown in FIG. 10, or may be formed in the glass sheet 11 side like the shade band 15b (broken line portion). In the construction of FIG. 10, the shade band 15 is located outside of the layer of the interlayer. In this construction, it is easy to form the interlayer by forming the films separately and bonding together without using co-extrusion.

Meanwhile, shade band may be formed in any layer of the multi-layer interlayer 12. Further, the shade band may be formed by coloring not only one layer but also a plurality of layers among the surface layers 12a and 12b and the layer 12c, and the positioning constructions of the shade band 15 of FIG. 9 and the shade bands 15a and 15b in FIG. 10 may be combined. In a case of coloring a plurality of layers, effect of coloring can be increased, and flexibility of design can be increased and e.g. changing of degree of coloring of each layer becomes possible.

Figure 11:
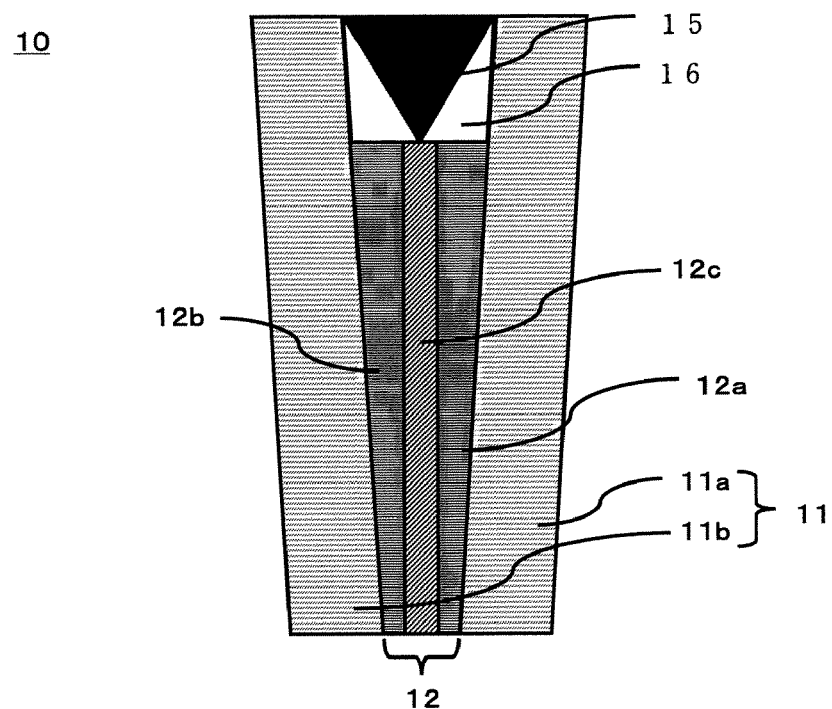
FIG. 11 is a cross sectional view showing an example of the construction of a laminated glass according to the present invention.

As shown in FIG. 11, a high-functional interlayer 12 and an interlayer having a shade band 15 may be arranged in a vertical direction of a vehicle. FIG. 11 shows an example in which a colored portion being a single layer having a shade band 15 and a transparent resin layer 16, is combined with a multi-layer interlayer. As shown in the figure, it is also possible to form an interlayer having a structure only having a colored portion by a different method and to provide a shade function by using it with a multi-layer interlayer 12. Here, the colored interlayer formed by another step may be a single layer or a multi-layer. In a case of forming the multi-layer interlayer and the colored interlayer so as to arrange in a plane direction, these interlayers may be integrally formed by e.g. a extrusion molding, or they may be bonded in the plane direction after they are each molded.

In a case where a layer having a shade band and a layer having no shade band are formed independently and they are laminated to form a multi-layer interlayer, design flexibility of the interlayer increases. At the same time, it becomes possible to dispose the shade band 15 at the center of the cross section of the interlayer, and accordingly, the interlayer 12 becomes reversible. Accordingly, alignment of the interlayer at a time of lamination becomes easy, which enables efficient production. Further, it is also possible to form the colored interlayer and the multi-layer interlayer by respective methods. Accordingly, migration of a colorant to other layers is suppressed, and thus, it becomes possible to suppress generation of e.g. blurring at the interface of the shade band.

Figure 12:
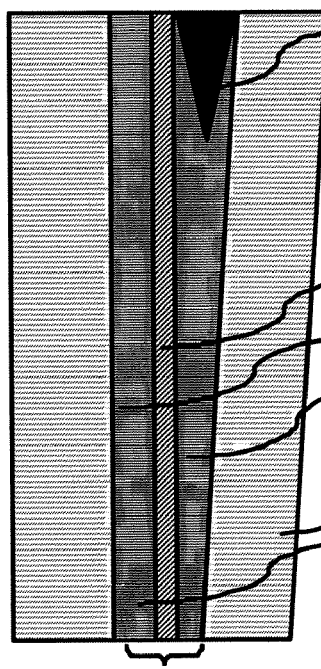
FIGS. 12(A) and 12(B) are cross sectional views showing examples of the construction of a laminated glass according to the present invention.
Figure 12:
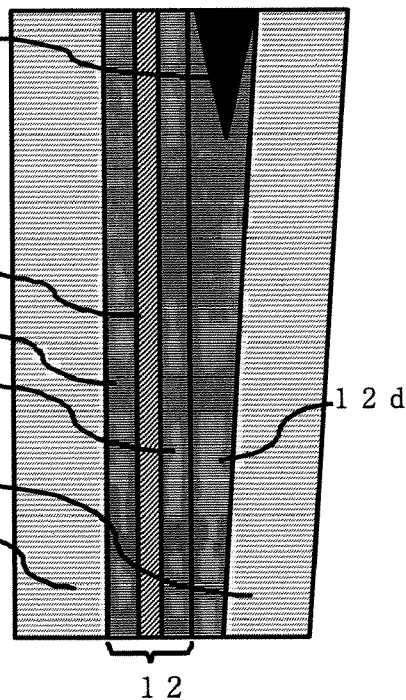

Further, it is sufficient that the multi-layer interlayer 12 has a desired wedge-shaped thickness profile as a whole, and as shown in FIG. 12, the multi-layer interlayer 12 may be formed by laminating a layer having a wedge-shaped thickness profile and a layer having a uniform thickness. The shade band 15 may be formed in a layer having a uniform thickness, but as shown in FIG. 12(A), the shade band is preferably formed in a layer (surface layer 12a in this case) having a wedge-shaped thickness profile. If a layer having a wedge-shaped thickness profile is colored, the thickness of colored layer changes stepwisely according to the thickness change in a wedge-shaped thickness profile, whereby it becomes easy to form a gradation. Further, expansion for forming a wedge-shaped thickness profile and expansion for aligning the shade band in a plane direction can be carried out at the same time, which realizes efficient production process.

Further, as shown in FIG. 12(B), a film 12d having a shade band 15 and having a wedge-shaped thickness profile may be further laminated on a multi-layer interlayer 12 having an uniform thickness. In this case, for the multi-layer interlayer 12, a commonly used multilayer can be employed and it becomes easy to optionally combine films formed by different methods or combine presence and is absent of expansion. Further, a film 12d having a shade band and a wedge-shaped thickness profile can be formed into a single layer, it is possible to expect an effect of easily obtaining accuracy of the angle of wedge-shaped thickness profile or the position of shade band.

Figure 13:
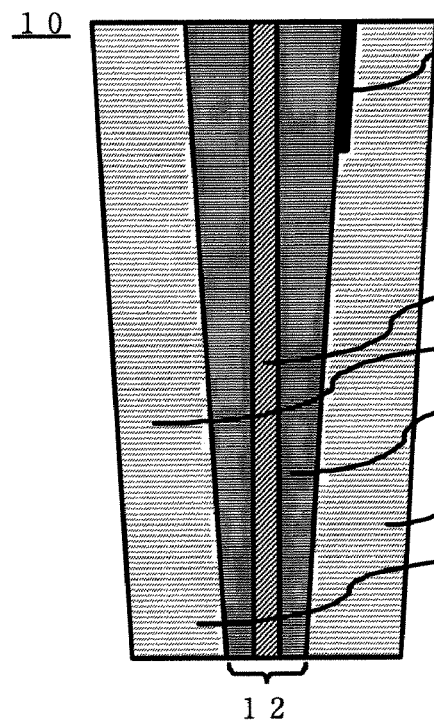
FIGS. 13(A) and 13(B) are cross sectional views showing examples of the construction of a laminated glass according to the present invention.
Figure 13:
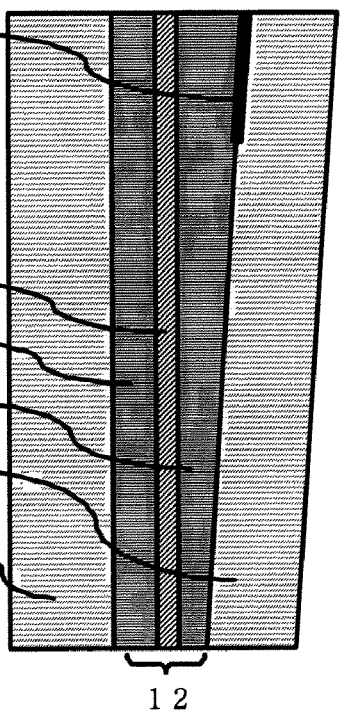

FIG. 13 shows an example of forming a thin-film shaped shade band 17 on a 2nd face being a car-exterior side surface of the surface layer 12a. Forming of the shade band 17 on the surface of the interlayer 12, can be carried out by painting or printing. Forming of the shade band by painting or printing can be carried out in any step before the interlayer is laminated to form a laminated glass, and in a case of forming the shade band on each multi-layer interlayer 12, the shade band may be painted on a surface of any layer.

In an interlayer having a plurality of layers of wedge-shaped thickness profile as shown in FIG. 13(A), it is possible to simplify the production process by forming a shade band 17 before expansion. On the other hand, in a construction in which a layer of wedge-shaped thickness profile and a layer having a cross section of constant thickness are combined as shown in FIG. 13(B), the shade band 17 may be formed on a surface of the layer of wedge-shaped thickness profile as shown in the figure, whereby it becomes possible to carry out painting after forming a multi-layer interlayer 12 and expanding it into substantially trapezoidal shape. In this case, since the shape of the shade band 17 does not change, there is no limitation to an external appearance design, such being preferred. On the other hand, in a case where the shade band 17 is formed on a surface of the layer having a uniform thickness (for example, on 3rd face), it is also possible to form the shade band irrespectively of forming of the wedge-shaped thickness profile of the interlayer.

Figure 14:
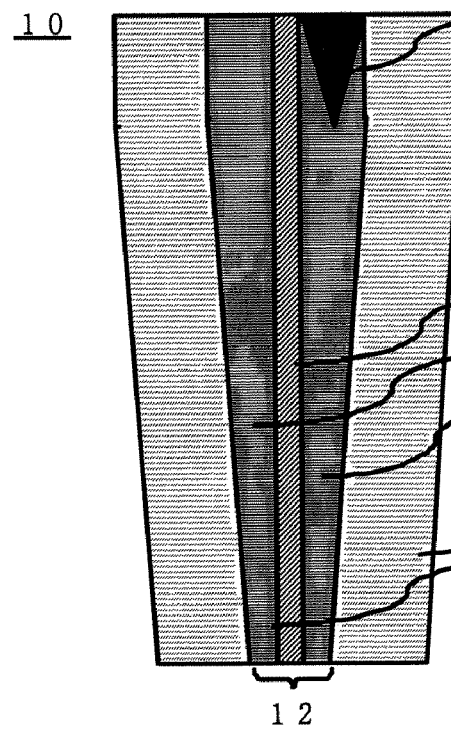
FIGS. 14(A) and 14(B) are cross sectional views showing examples of the construction of a laminated glass according to the present invention.
Figure 14:
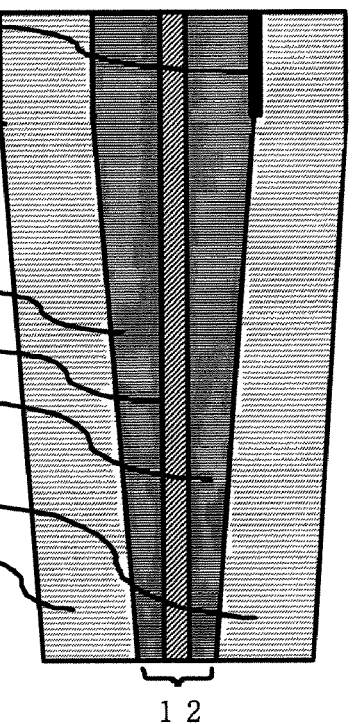

FIGS. 14(A) and (B) show examples of the construction in which a construction having a uniform thickness profile and a shade band. A shade band shown in FIG. 14(A) made of a colored layer and a shade band shown in FIG. 14(B) formed by painting, may be suitably combined with an interlayer or a laminated glass having a cross section of uniform thickness. Among such combinations with non-wedge-shaped thickness profiles, in a case of forming a shade band 15 or 17 on a layer having a cross section of uniform thickness, distortion of shade band less likely occurs, which improves external appearance. Further, positioning of shade band in a step of laminating glass sheets with an interlayer, becomes easy, which enables an efficient production.

Further, the interlayer 12 may have an IR-shielding function. In order to add an IR-shielding function, a method of dispersing IR-cutoff fine particles (hereinafter simply referred to as fine particles) in an interlayer 12a or 12b or a sound insulation layer 12c, can be suitably applied. Average particle size of the fine particles to be dispersed is preferably at most 0.2 μm, and the material of the particles may be a metal selected from the group consisting of Re, Hf, Nb, Sn, Ti, Si, Zn, Zr, Fe, Al, Cr, Co, Ce, In, Ni, Ag, Cu, Pt, Mn, Ta, W, V and Mo, their oxides, their nitrides, their sulfides or their silicates, or inorganic particles formed by doping Sb or F to these materials, or an organic IR absorber of e.g. phthalocyanine type, and these particles are used alone or in combination.

Further, as the fine particles, antimon-doped tin oxide (ATO) particles, or tin-doped indium oxide (ITO) particles may be used alone or they may be used in combination. ATO particles and ITO particles are excellent in IR-shielding property, and which realizes desired IR insulation performance by slight amount of composition.

In a case of dispersing fine particles in an interlayer 12, the fine particles are preferably dispersed in a layer having a wedge-shaped thickness profile among surface layers 12a and 12b and a sound insulation layer 12c, for the following reasons. Namely, if the interlayer is formed after the fine particles are dispersed in the material of the interlayer, volume proportion of the fine particles in the film becomes uniform without applying special treatment. Accordingly, if the fine particles are dispersed in the layer having a wedge-shaped thickness profile, in terms of the amount of fine particles integrated in the thickness direction of the layer in which the fine particles are dispersed, the amount of fine particles in a thick portion is larger than the amount of fine particles in the thin portion. Since the following explanation about the amount of fine particles is the explanation of the amount integrated in the thickness direction, a phrase "integrated in the thickness direction" is omitted.

Thus, it is possible to make a thick portion of the interlayer 12 have higher IR-shielding performance than a thin portion. When a laminated glass employing such an interlayer 12 is attached to a vehicle, an upper side becomes a thick portion. Accordingly, when such a laminated glass is employed as an windshield of a vehicle, a portion corresponding to a head of passengers suitably shields infrared rays. These are the reasons why the fine particles are preferably dispersed in a layer having a wedge-shaped thickness profile among surface layers 12a and 12b and a sound-insulation layer 12c in a case of dispersing fine particles in the interlayer 12. Here, at a time of producing an interlayer having a wedge-shaped thickness profile, it is possible to make the amount of fine particles in a thick portion more than the amount of fine particles in a thin portion in each of a case of producing the interlayer by expansion, a case of extrusion molding the interlayer to have a wedge-shaped thickness profile at a time of forming the interlayer, and a case of producing the interlayer by bonding.

In a case of forming at least one of the surface layers 12a and 12b to have a wedge-shaped thickness profile, fine particles are preferably dispersed in at least one of the surface layers 12a and 12b from a viewpoint of control of layer thickness or shape-keeping property. In a case of forming one of the surface layers 12a and 12b to have a wedge-shaped thickness profile, the construction may be such that fine particles are dispersed in a layer having a wedge-shaped thickness profile and the fine particles are also dispersed in the other layer.

On the other hand, the fine particles may be dispersed in all of the layers 12a, 12b and 12c. Further, in both of a case of multi-layer film like the present invention and other cases, by dispersing the fine particles in an interlayer having a wedge-shaped thickness profile, it is possible to form a laminated glass which makes passengers feel less heat. However, if the amount of the particles in the thick portion is excess, JR-shielding visible light transmittance decreases. In such a case, by appropriately combining optical characteristics of glass sheets, dispersion percentage of fine particles in the interlayer material, the thickness of the thick portion or the thickness of the thin portion, the angle of the wedge shape and the like, it is possible to obtain desired IR insulation property and visible light transmittance. Among these, it is preferred to disperse the fine particles in a layer having a wedge-shaped thickness profile also in terms of easiness of adjustment. Further, dispersion percentages of the fine particles in the interlayer material in respective sub-layers of the interlayer, may be different.

An example has been shown, which employs curved single-plate glass sheets as the glass sheets 11, but in terms of the shape, a glass of a flat-shape or a curved shape may be used, and in terms of construction, a normal single plate glass, a tempered glass, a laminated glass with wire grid heater and the like may be used, and in terms of color and composition, not only a transparent glass, but also commonly used colored glass for vehicles of such as green, brown, blue or the like may be employed. Further, the glass sheet 11 may be provided with e.g. a coating to add functionality. A function of selectively transmitting or attenuating light of specific wavelength such as shielding of infrared rays or ultraviolet rays, water repellent function, hydrophilic function, antifogging function, antireflective function or the like may be suitably added. Further, the glass sheet 11 may have a shade functional area in the upper side. To form the shade function area, colored ceramics, weather-resistant paint and the like can be suitably employed.

In terms of the material of the glass sheets, besides an inorganic glass, a so-called organic transparent resin glass made of such material as polycarbonate, polystyrene, polymethyl methacrylate, may be used alone or two or more types of these may be used in combination.

Further, an example of interlayer 12 formed by laminating surface layers and a sound insulation layer has been shown here, but the present invention is not limited to this example, and the present invention is applicable to any construction so long as the it has a multi-layer interlayer constituted by layers having different hardness. Functions of the layers are not limited to sound insulation but various functions such as UV absorption, IR absorption, electromagnetic shielding, anti-glare function, or selective transmittance, selective reflection or selective absorption of electromagnetic waves, may be combined. Further, the layer provided with functionality is not limited to a layer having low hardness or a layer sandwiched by other layers, but surface layers may also be provided with functionality.

Further, the display information is not limited to instrument panel information such as velocity information, tachometer information or fuel meter information, but an information can be provided so long as it is an information necessary for a driver, such as traffic information, navigation information using e.g. a pointer, alarm of walkers or obstacles using e.g. ITS, road surface information, external environmental information such as a temperature or the like, without limiting to driving information.

Second Embodiment

Figure 4:
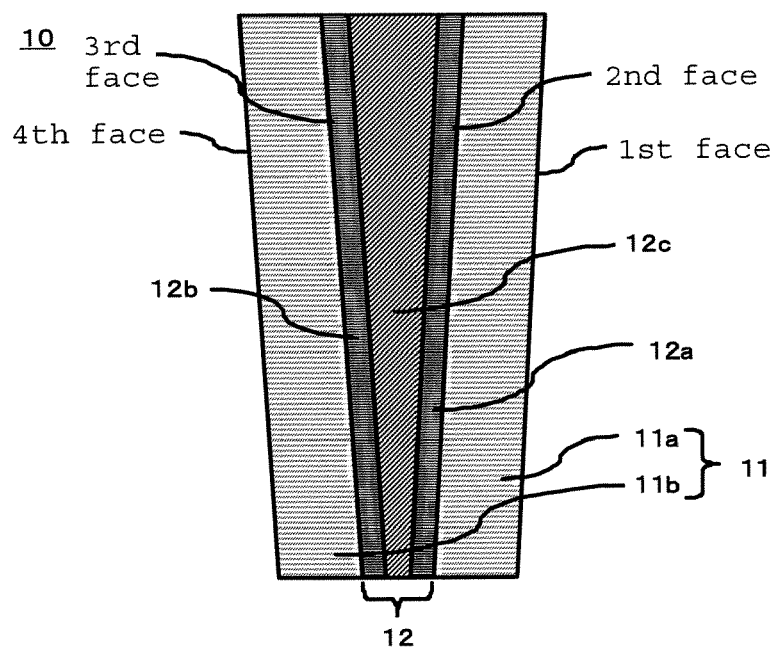
FIG. 4 is a cross sectional view showing an example of the construction of a laminated glass according to the present invention.

FIG. 4 is a cross sectional view showing an example of the construction of a laminated glass according to the present invention. In the same manner as the first embodiment, an interlayer 12 has a wedge-shaped thickness profile in which an upper side is thick and a lower side is thin, and glass sheets 11 are adhered the wedge-shaped interlayer. As a result, the laminated glass has a wedge-shaped thickness profile.

The interlayer 12 is a multi-layer film containing surface layers 12a and 12b and a sound insulation layer 12c sandwiched between them, and the interlayer 12 is adhered to the 2nd face of the glass sheet 11a and the 3rd face of the glass sheet 11b, to form a laminated glass 10. The surface layers 12a and 12b are each a resin layer having an uniform thickness, and the sound insulation layer 12c sandwiched between them has a wedge-shaped thickness profile in which the upper side is thick and a lower side is thin, and the sound insulation layer 12c is made of a resin having lower hardness than the surface layers.

Here, at least one layer of the surface layers 12a and 12b of the interlayer before expansion, may have a wedge-shaped thickness profile in which the upper side is thin and the lower side is thick, that is a reversed wedge shape from the wedge shape after expansion. By preparing at least one layer of the surface layers 12a and 12b to have a reverse wedge-shaped thickness profile, it becomes possible to uniformize the thicknesses of the surface layers 12a and 12b after expansion.

In this construction, since the layer having low hardness can have sufficient thickness, it is easy to add new functions such as sound insulation to the layer sandwiched in the interlayer 12. Further, since the surface layers 12a and 12b having high hardness sandwiching the sound insulation layer 12c, not necessarily have wedge shapes, this construction is suitable for a case of forming the three layers into respective desired shapes and thicknesses, and laminating then to form an interlayer.

For constructions other than those of the above-mentioned, the construction of the first embodiment can be applied in the same manner, and equivalent effect can be expected.

Third Embodiment

Figure 5:
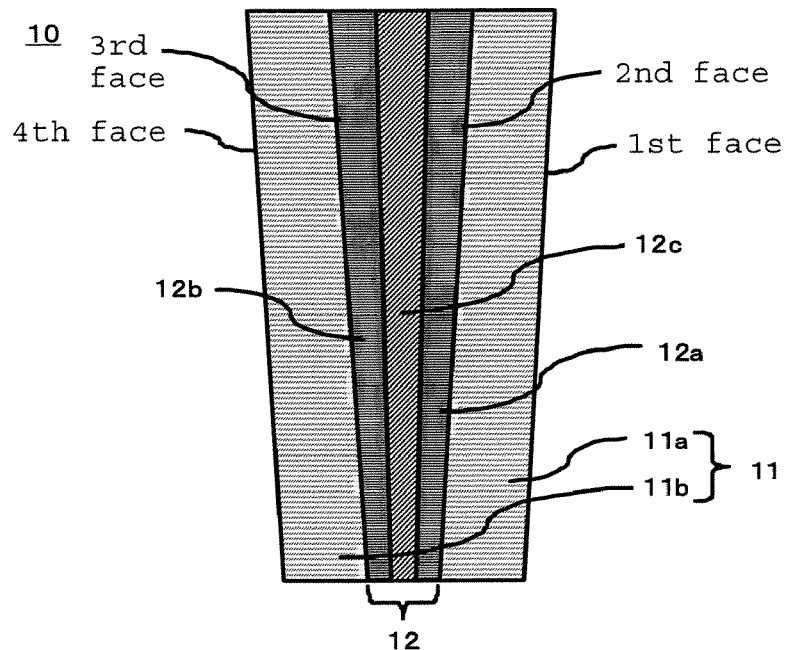
FIG. 5 is a cross section view showing an example of the construction of a laminated glass according to the present invention.

FIG. 5 is a cross sectional view showing an example of the construction of a laminated glass according to the present invention. In the same manner as the first embodiment, an interlayer 12 has a wedge-shaped thickness profile in which an upper side is thick and a lower side is thin, and glass sheets 11 are bonded to a wedge-shaped interlayer so as to sandwich the interlayer. As a result, a laminated glass 10 has a wedge-shaped thickness profile.

The interlayer is a multi-layer film containing surface layers 12a and 12b and a sound insulation layer 12c sandwiched by the surface layers, and the interlayer is bonded to the 2nd face of the glass sheet 11a and the 3rd face of the glass sheet 11b, to form the laminated glass 10. The surface layers 12a and 12b and the sound insulation layer 12c each has a wedge-shaped thickness profile in which the upper side is thick and the lower side is thin, and the sound insulation layer 12c is made of a resin having lower hardness than the surface layers.

In this embodiment, it is possible to obtain both of the effects of the first embodiment and the second embodiment by changing the shape of the wedge-shaped thickness profile of the sound insulation layer 12c sandwiched by the surface layers 12a and 12b. Accordingly, it is possible to change the proportion of the combination of the layers according to desired effects, which increases design flexibility.

Figures 15A, 15B:
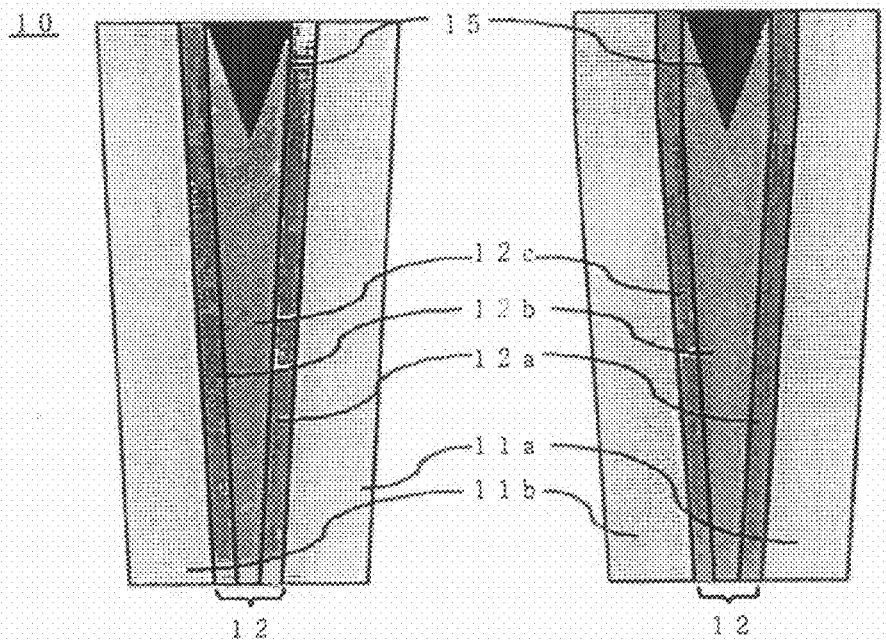
FIGS. 15(A) and 15(B) are cross sectional views showing examples of the construction of a laminated glass according to the present invention.
Figure 16:
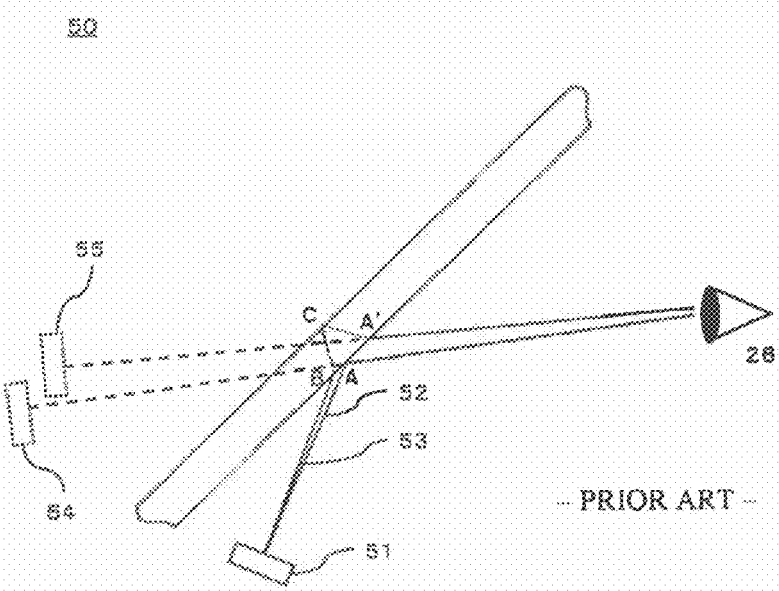
FIG. 16 is a schematic view showing an example of the construction of conventional head-up display device.

FIG. 15 shows examples of construction in which surface layers having a cross section of uniform thickness is combined with a shade band. A shade band made of a colored layer shown in FIG. 15(A) and a shade band formed by arranging two interlayers in a vertical direction shown in FIG. 15(B), can be suitably combined with an interlayer or a laminated glass having a cross section of uniform thickness. Among combinations with an interlayer having a non-wedge-shaped cross section, by forming shade band 15 or 17 in a cross section of uniform thickness, distortion of shade band is reduced to improve external appearance. Further, positioning of shade band in a step of laminating glass sheets and an interlayer, becomes easy, which enables efficient production. Further, with respect to constructions other than the above-mentioned constructions, constructions of the first and the second embodiments can be applied in the same manner, and equivalent effect is expected.

Then, an example of production method of a laminated glass according to the present invention is described using a case of employing normal single-plate glass sheets as an example.

Glass sheets 11 before bending are each cut into a predetermined shape. Here, a concealing layer (not shown) may be formed on a desired surface. The concealing layer may be formed by using a known material such as colored ceramic paste, and known production method. A glass sheet 11 coated with a concealing layer, is preliminarily dried, and placed on a predetermined mold and bent into a desired shape by using a heating furnace, a cooling furnace and the like. An interlayer 12 is formed by laminating surface layers and a sound insulation layer, and expanded into a desired shape. Thereafter, the interlayer 12 is sandwiched by two glass sheets 11a and 11b. The sandwiching glass sheets 11 and the interlayer 12 are preliminarily press-bonded, and treated in an autoclave to form a laminated glass 10.

The interlayer 12 is formed by co-extruding materials for surface layers and a material for a sound insulation layer so that the materials for surface layers sandwich the material for sound insulation layer, to form an interlayer 12 having a three-layer structure. Besides this method, the interlayer 12 having three layer structure can be formed also by extruding materials for the three layers to be the respective films, laminating the films in a desired lamination order and thermally bonding them. The surface layers and the sound insulation layer may contain an additive such as a plasticizer. Specifically, the method disclosed in JP-A-2000-272936 is preferred.

According to JP-A-2000-272936, the sound insulation layer 12c can be formed by the following method. To 100 parts of PVB-c (degree of butyral: 60.2 mol %, amount of acetyl group: 11.9 mol %) as a thermoplastic resin, 60 parts of triethylene glycol-di-2-ethylbutyrate (3GH) as a plasticizer, is added, and they are sufficiently kneaded by a mixing roll. Thereafter, using a press-molding machine, the material is press-molded at 150° C. for 30 minutes to form a first layer of 0.2 mm thick. With respect to surface layers 12a and 12b, to 100 parts of polyvinyl butyral resin [PVB-a (degree of butyral: 65.9 mol %, amount of acetyl group: 0.9 mol %)] as a thermoplastic resin, 40 parts of 3GH as a plasticizer, is added, and they are sufficiently kneaded by a mixing roll. Thereafter, using a press-molding machine, the material is press-molded at 150° C. for 30 minutes to form second and third layers of 0.2 mm thick and 0.4 mm thick respectively.

Figure 6A:
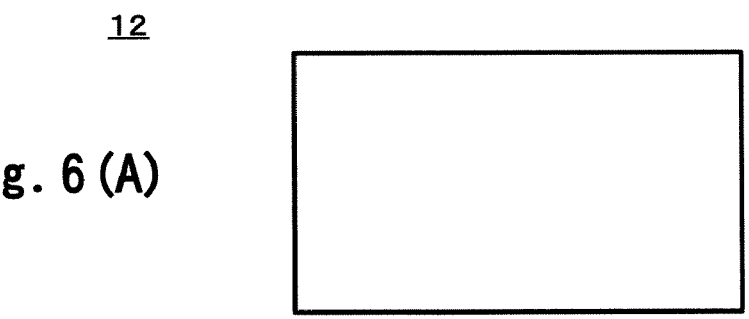
FIGS. 6(A) and 6(B) are schematic views showing an example of an expansion method of an interlayer of a laminated glass.
Figure 6B:
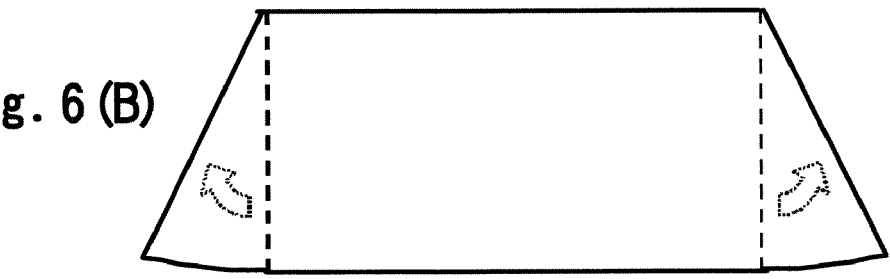

FIGS. 6(A) and 6(B) are schematic views showing an example of a method of expanding an interlayer. FIG. 6(A) shows a multi-layer interlayer 12 before expansion having layers of different hardness. The interlayer before expansion has substantially rectangular shape, and by expanding left and right sides, the interlayer is expanded to have substantially trapezoidal shape as shown in FIG. 6(B) so as to be accommodated with plane shape of a laminated glass. At this time, a lower side of the interlayer that is expanded to a large degree, is thinner than an upper side of the interlayer, whereby a wedge-shaped thickness profile is formed.

Further, as another method for forming an interlayer 12, a method of extrusion molding the interlayer 12 so as to have a wedge-shaped thickness profile is also possible. In this case, a multi-layer film having a wedge-shaped thickness profile may be formed by co-extrusion, or it may be formed by forming the respective layers and bonding them together. In the case of forming the interlayer 12 by bonding, the respective layers may be formed by different methods such as expansion and extrusion.

In the present invention, in an interlayer constituted by three layers, first resin layers sandwiching a second resin layer from both sides have higher hardness than the second resin layer. However, the hardness of the first resin layer higher than the second resin layer, can prevent the thickness of a lower side of the multi-layer interlayer constituted by three layers where the proportion of expansion is large, from becoming too thin when the multi-layer interlayer is expanded to have substantially trapezoidal shape and a wedge-shaped thickness profile.

Here, "becoming too thin" means, for example, becoming to have a thickness of less than about 0.3 mm which causes insufficient deaeration and insufficient press-bonding at a time of lamination to form a laminated glass and causes optical distortion. The proportion of the hardness of the first resin layer to that of the second resin layer is appropriately selected depending on the press-bonding conditions at a time of producing a laminated glass, thicknesses of the resin layers in the interlayer and the type of resin layers.

Figure 7A:
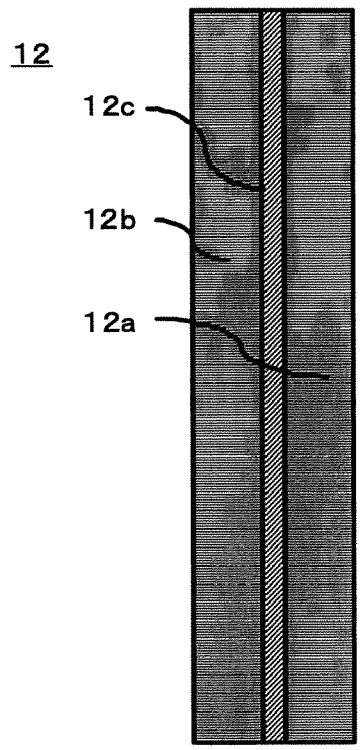
FIGS. 7(A) and 7(B) are cross sectional schematic views showing an example of interlayers before and after expansion at a time of forming a wedge-shaped thickness profile of an interlayer according to the present invention.
Figure 7B:
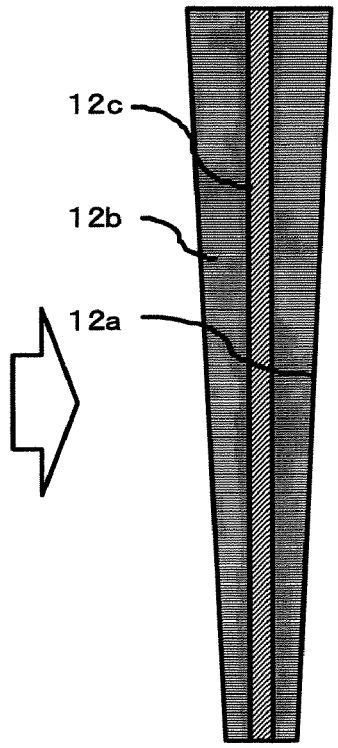

FIGS. 7(A) and 7(B) are cross sectional schematic views showing an example of interlayers before and after expansion at a time of forming a wedge-shaped thickness profile by the expansion. In the cross section before expansion shown in FIG. 7(A), the surface layers 12(a) and 12(a) and a sound insulation layer 12(a) sandwiched between them, each has a uniform thickness. By expanding left and right sides of the interlayer, the laminated three layers are expanded at the same time to form a wedge-shaped thickness profile after expansion as shown in FIG. 7(B). Here, the sound insulation layer 12c is also expanded, but in a case where the thickness of the sound insulation layer having low hardness is about from 0.1 to 0.3 mm and the thickness is sufficiently thinner than the surface layers, change of the thickness is negligible. Accordingly, substantially, the wedge shape is formed only by the change of the thicknesses of the first layers 12a and 12b. Accordingly, it is possible to form a sound insulation layer 12c having a uniform thickness.

Forming of a wedge-shaped thickness profile by the above expansion method, is suitably employed for a construction of e.g. a laminated shielded glass in which the thickness of a layer having lower hardness (second resin layer) is thinner than surface layers having high hardness (first resin layers).

By employing the above-mentioned method, it is possible to make a laminated rectangular interlayer transform in the plane direction and the cross sectional direction at the same time in a single expansion step. Accordingly, it is possible to obtain an interlayer 12 having a desired plane shape and desired wedge-shaped thickness profile easily, which enables efficient production.

Further, by changing the timing or the order of expansion step, it is possible to appropriately select an interlayer from a rectangular interlayer having an uniform thickness and an interlayer having substantially trapezoidal plane shape and a wedge-shaped thickness profile. Accordingly, it is possible to select transportation method or production process suitable for the form of production. As a result, it is possible to make the business more flexible and achieve efficient production.

Figure 8A:
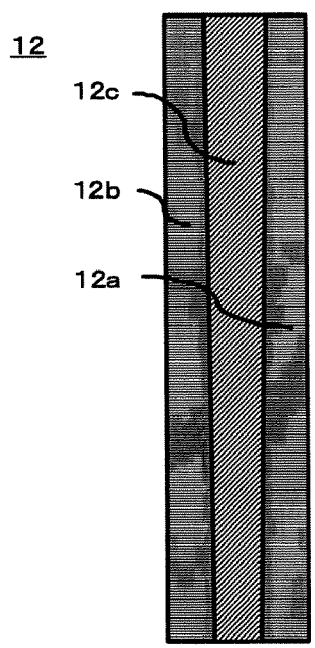
FIGS. 8(A) and 8(B) are cross sectional schematic views showing an example of interlayers before and after expansion at a time of forming a wedge-shaped thickness profile of an interlayer according to the present invention.
Figure 8B:
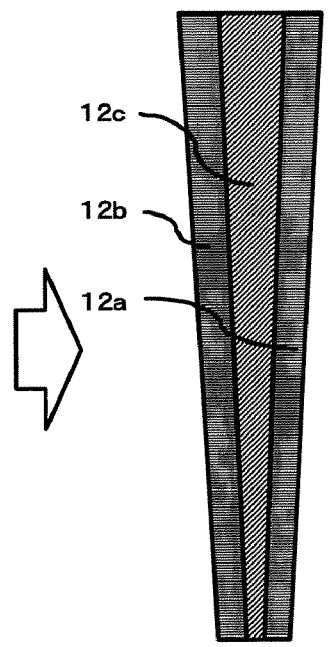

FIGS. 8(A) and (B) are cross sectional schematic views showing another example of interlayers before and after expansion at a time of forming a wedge-shaped thickness profile by expansion. In the cross section of an interlayer 12 before expansion shown in FIG. 8(A), surface layers 12a and 12b and a sound insulation layer 12c sandwiched by them each has substantially uniform thickness, and the sound insulation layer 12c has a thickness sufficient for transforming. By expanding left and right sides of the interlayer in the same manner as FIG. 7, the laminated three layers are expanded at the same time, to form an interlayer having a wedge-shaped thickness profile in which the three layers each has a wedge-shaped thickness profile as shown in FIG. 8(B).

Forming of a wedge-shaped thickness profile by the above expansion method, can be suitably employed in a construction of e.g. a laminated insulated glass in which the thickness of a layer having low hardness (second resin layer) has sufficient thickness equivalent to the thickness of surface layers having high hardness (first resin layers).

In this example, since it is possible to selectively determine the proportion of the thickness of a high-functional layer such as the sound-insulation layer 12c to the thickness of the interlayer 12, it is easy to add a desired function. Further, since it is possible to select efficient production method or transportation method, equivalent effects to the above mentioned effects can be obtained.

In this example, a method of forming an interlayer 12 having a wedge-shaped thickness profile by expanding the interlayer 12 into substantially trapezoidal shape after lamination is used, but the interlayer may be formed by expanding layers before lamination and lamination may be carried out after the expansion. In this case, it is possible to form the interlayer having a wedge-shaped thickness profile, by optionally combining a layer having a wedge-shaped thickness profile with a layer having an uniform thickness profile.

In the construction of laminated glass having a shade band, in a case of forming the shade band in an interlayer before expansion, it is preferred to expand the interlayer so that the angle of wedge-shaped thickness profile and the position of the shade band in the plane direction become desired angle and position. In a case where an expansion rate required to achieve the angle of wedge-shaped thickness profile and an expansion rate required to achieve the position of shade band in the plane direction, are different, the shade band may be prepared to have non-linear strip shape in the plane direction considering the shape after the expansion. Namely, by forming the shade band on an interlayer before expansion so that the shade band has a waveshape having a cycle corresponding to the size of a windshield in the plane direction, it is possible to absorb the difference of expansion rates required.

At a time of forming a shade band by co-extrusion molding, a notch portion is usually formed in an interlayer to form a colored layer. In order to form a shade band having a waveshape, the method may be such that a core in a metal mold for forming the notch is moved in and out in the direction of the notch at the time of molding to form a waveshaped notch, the notch is colored with e.g. a pigment or a dye, and a resin thus formed is co-extruded. On the other hand, in a case of forming a shade band by painting or printing, the shade is band may be formed on an interlayer before expansion, to have a waveshape having a cycle corresponding to the size of an windshield in the same manner as above, or the shade band may be formed on the interlayer after expansion, to have a desired shape directly by painting or printing.

INDUSTRIAL APPLICABILITY

The present invention can be suitably applied to an windshield for a vehicle provided with a display device such as a head-up display.

Here, in the above, examples of applying the present invention to an windshield for a vehicle, particularly to a head-up display for an automobile, but the present invention is not limited thereto, and for example, the present invention can be applied to other openings for a vehicle such as an automobile, or to openings of a transportation vehicle such as an airplane or a ship. Further, the present invention can be applied to various applications to high-functional glasses such as sound-insulation glasses which require display function, to prevent double images, within a range not missing the effect.

The entire disclosures of Japanese Patent Application No. 2005-372291 filed on Dec. 26, 2005, Japanese Patent Application No. 2006-016407 filed on Jan. 25, 2006 and Japanese Patent Application No. 2006-229348 filed on Aug. 25, 2006 including specifications, claims, drawings and summaries are incorporated herein by reference in their entireties.

What is claimed is:

1. A laminated glass for a vehicle, comprising:
two curved glass sheets opposing each other; and
an interlayer interposed between the glass sheets with the glass sheets and the interlayer being laminated together,
wherein the interlayer is a multilayer film comprising at least one first resin layer and at least one second resin layer having lower hardness than that of the at least one first resin layer,
wherein the interlayer has a wedge-shaped thickness profile in which an upper side of the interlayer, when the laminated glass is in a position attached to a vehicle, is thicker than a lower side of the interlayer,
wherein a thickness of the at least one first resin layer is at least 0.3 mm in an area to be used for a heads up display (HUD) within 400 mm from an edge of the lower side of the interlayer such that embossing on a surface of the at least one first resin layer is eliminated from the area to be used for a HUD.

2. The laminated glass for a vehicle according to claim 1, wherein the interlayer comprises three layers including the at least one second resin layer interposed between two of the first resin layers.

3. The laminated glass for a vehicle according to claim 1 or 2, wherein at least one layer of the first resin layers has a wedge-shaped thickness profile with a thickness at the upper side of the layer being thicker than a thickness at the lower side of the layer.

4. The laminated glass for a vehicle according to claim 1 or 2, wherein at least one layer of the second resin layers has a wedge-shaped thickness profile with a thickness at the upper side of the layer being thicker than a thickness at the lower side of the layer.

5. The laminated glass for a vehicle according to claim 1 or 2, wherein the thickness of the first resin layer at the upper side is at least 0.5 mm.

6. The laminated glass for a vehicle according to claim 3, further comprising a shade functional area having a strip shape along the upper side.

7. The laminated glass for a vehicle according to claim 6, wherein the shade functional area is formed in at least one layer of the first resin layers which has the wedge-shaped thickness profile.

8. A laminated glass for a vehicle, comprising:
two curved glass sheets opposing each other;
an interlayer made of a multi-layer organic resin and interposed between the glass sheets with the glass sheets and the interlayer being laminated together,
wherein the interlayer is a multilayer film comprising at least one first resin layer and at least one second resin layer having lower hardness than that of the at least one first resin layer,
wherein the interlayer has a wedge-shaped thickness profile in which an upper side of the interlayer, when the laminated glass is in a position attached to a vehicle, is thicker than a lower side of the interlayer, and
wherein a thickness of the at least first resin layer is at least 0.3 mm in an area to be used for a HUD within 400 mm from an edge of the lower side of the interlayer such that embossing on a surface of the at least one first resin layer is eliminated from the area to be used for a HUD; and
IR cutoff fine particles dispersed in at least one of the first and second resin layers having the wedge-shaped thickness profile.

9. The laminated glass for a vehicle according to claim 8, wherein the interlayer comprises three layers including the at least one second resin layer interposed between two of the first resin layers.

10. The laminated glass for a vehicle according to claim 9, wherein at least one layer of the first resin layers has a wedge-shaped thickness profile with a thickness at the upper side of the layer being thicker than a thickness at the lower side of the layer.

11. The laminated glass for a vehicle according to claim 9, wherein at least one layer of the second resin layers has a wedge-shaped thickness profile with a thickness at the upper side of the layer being thicker than a thickness at the lower side of the layer.

12. The laminated glass for a vehicle according to claim 8, wherein the thickness of the first resin layer at the upper side is at least 0.5 mm.

13. The laminated glass for a vehicle according to any one of claims 10, 11 or 12, further comprising a shade functional area having a strip shape along the upper side.

14. The laminated glass for a vehicle according to claim 13, wherein the shade functional area is formed in at least one layer of the first resin layers which has the wedge-shaped thickness profile.

15. The laminated glass for a vehicle according to claim 8, wherein the IR cutoff fine particles are dispersed in a layer having a shade functional area.

16. A head-up display device comprising:
a light source for emitting light beam of display information;
a glass sheet disposed so as to be opposed to the light source; and
a display area formed on the glass sheet and configured to display the display information emitted from the light source, wherein the glass sheet is a laminated glass sheet comprising:
two curved glass sheets opposing each other; and
an interlayer interposed between the glass sheets and laminated together, wherein:
the laminated glass has a wedge-shaped thickness profile in which an upper side of the laminated glass, when the laminated glass is attached to a vehicle, is thicker than a lower side of the laminated glass, and
the interlayer comprises at least a first resin layer and a second resin layer having a hardness lower than that of the first resin layer, and a thickness of the first resin layer in the display area is at least 0.3 mm such that embossing on a surface of the first resin layer is eliminated from the display area.

17. The head-up display device according to claim 16, further comprising IR cutoff fine particles dispersed in at least one of the first and second resin layers which has the wedge-shaped thickness profile.

18. The head-up display device according to claim 16 or 17, further comprising a shade functional area having a strip shape along the upper side.

19. The head-up display device according to claim 18, wherein the shade functional area is formed in the layer which has the wedge-shaped thickness profile.

20. The head-up display device according to claim 18, wherein the IR cutoff fine particles are dispersed in the layer having the shade functional area.

* * * * *